United States Patent
Sugiyama et al.

(10) Patent No.: US 9,755,551 B2
(45) Date of Patent: Sep. 5, 2017

(54) POWER CONVERSION DEVICE

(71) Applicant: TOSHIBA MITSUBISHI-ELECTRIC INDUSTRIAL SYSTEMS CORPORATION, Chuo-ku (JP)

(72) Inventors: Takashi Sugiyama, Chuo-ku (JP); Naoki Morishima, Chuo-ku (JP)

(73) Assignee: TOSHIBA MITSUBISHI-ELECTRIC INDUSTRIAL SYSTEMS CORPORATION, Chou-ku (JP)

( * ) Notice: Subject to any disclaimer, the term of this patent is extended or adjusted under 35 U.S.C. 154(b) by 0 days.

(21) Appl. No.: 15/109,219

(22) PCT Filed: Jan. 6, 2014

(86) PCT No.: PCT/JP2014/050020
§ 371 (c)(1),
(2) Date: Jun. 30, 2016

(87) PCT Pub. No.: WO2015/102049
PCT Pub. Date: Jul. 9, 2015

(65) Prior Publication Data
US 2016/0329834 A1    Nov. 10, 2016

(51) Int. Cl.
*H02M 7/797* (2006.01)
*H02M 7/81* (2006.01)
(Continued)

(52) U.S. Cl.
CPC .............. *H02M 7/797* (2013.01); *H02M 1/12* (2013.01); *H02M 7/487* (2013.01); *H02M 7/49* (2013.01);
(Continued)

(58) Field of Classification Search
CPC ........... H02M 1/12; H02M 2001/0025; H02M 2001/0077; H02M 7/487; H02M 7/49; H02M 7/5395; H02M 7/81; H02M 7/797
See application file for complete search history.

(56) References Cited

U.S. PATENT DOCUMENTS 8,472,215 B2 * 6/2013 Koyama ............... H02M 1/126
                                                  363/131
8,787,049 B2 * 7/2014 Chivite Zabalza ..... H02M 7/49
                                                  363/71
(Continued)

FOREIGN PATENT DOCUMENTS

EP    0 642 212 A1    3/1995
EP    0 891 037 A2    1/1999
(Continued)

OTHER PUBLICATIONS

International Search Report Issued Mar. 25, 2014 in PCT/JP2014/050020.
(Continued)

*Primary Examiner* — Fred E Finch, III
*Assistant Examiner* — Demetries A Gibson
(74) *Attorney, Agent, or Firm* — Oblon, McClelland, Maier & Neustadt, L.L.P.

(57) ABSTRACT

A power conversion device includes: a plurality of 3-level converters (31 to 35) that are multiple-connected in series to an AC power supply; and a control device (10) controlling operations of the plurality of 3-level converters (31 to 35). The control device (10) includes: a calculation unit calculating an output voltage command for the plurality of 3-level converters (31 to 35); a carrier signal generation unit generating a carrier signal; a correction unit correcting a phase of the carrier signal based on a potential variation on a DC neutral point bus (7); and a pulse width modulation control unit delaying the phase by a prescribed amount based on the (Continued)

carrier signal having the phase corrected by the correction unit as a reference phase, to generate a plurality of carrier signals, and comparing the output voltage command with each of the plurality of carrier signals to generate a control command for each of the plurality of 3-level converters (31 to 35).

2 Claims, 11 Drawing Sheets

(51) Int. Cl.
  *H02M 1/12* (2006.01)
  *H02M 7/487* (2007.01)
  *H02M 7/49* (2007.01)
  *H02M 7/5395* (2006.01)
  *H02M 1/00* (2006.01)

(52) U.S. Cl.
  CPC ........... *H02M 7/5395* (2013.01); *H02M 7/81* (2013.01); *H02M 2001/0025* (2013.01); *H02M 2001/0077* (2013.01)

(56) References Cited

U.S. PATENT DOCUMENTS

| | | | |
|---|---|---|---|
| 9,537,415 B2* | 1/2017 | Fujii | H02M 1/00 |
| 2008/0291708 A1* | 11/2008 | Teichmann | H02M 1/32 363/50 |
| 2011/0141786 A1* | 6/2011 | Shen | H02M 7/487 363/131 |
| 2013/0016549 A1* | 1/2013 | Kieferndorf | H02M 7/487 363/131 |
| 2015/0200602 A1* | 7/2015 | Narimani | H02M 5/4585 363/37 |
| 2015/0303819 A1* | 10/2015 | Qu | H02M 7/487 363/35 |
| 2015/0303826 A1* | 10/2015 | Arnedo | H02M 7/537 363/97 |
| 2016/0211749 A1* | 7/2016 | Okada | H02M 7/487 |

FOREIGN PATENT DOCUMENTS

| | | |
|---|---|---|
| JP | H06-233537 A | 8/1994 |
| JP | 7-79574 A | 3/1995 |
| JP | 7-135782 A | 5/1995 |
| WO | 2011/110472 A1 | 9/2011 |

OTHER PUBLICATIONS

Shimamura, et al., "Balancing Control of DC Input Capacitor Voltage on NPC Inverter," The Institute of Electrical Engineers of Japan, The Papers of Technical Meeting for The Institute of Electrical Engineers of Japan, Technical Meeting on Semiconductor Power Converter, SPC-91-25-37, Jun. 21, 1991, 13 pages (with partial English translation).

Extended European Search Report dated May 22, 2017, in European Patent Application No. 14876755.1.

* cited by examiner

POWER CONVERSION DEVICE

TECHNICAL FIELD

The present invention relates to a power conversion device, and more particularly to a power conversion device having a plurality of 3-level converters that are multiple-connected to each other.

BACKGROUND ART

In recent years, 3-level converters have been gaining attention, for example, because they can relatively readily achieve a high voltage and a large capacity with few output harmonics. For example, for a self-exciting reactive power compensation device such as a STATCOM (Static Synchronous Compensator), an SVG (Static Var Generator) or a self-exiting SVC (Static Var Compensator), there has been a proposed configuration in which a neutral-point clamp-type 3-level converter is used in a power conversion device made using a semiconductor switching element having a high breakdown voltage and a large rated current.

According to this 3-level converter, it has conventionally been known that, according to a switching pattern, there occurs a time period during which the neutral point in a direct-current (DC) power supply circuit is connected to an alternating-current (AC) line through a switching element and a diode, and the potential at the neutral point varies due to the current flowing through the neutral point during this time period (for example, see Japanese Patent Laying-Open No. 07-79574 (PTD 1); Japanese Patent Laying-Open No. 07-135782 (PTD 2); and "Balancing Control of DC Input Capacitor Voltage on NPC Inverter" by Shimamura et al., (The Institute of Electrical Engineers of Japan, The Papers of Technical Meeting on Semiconductor Power Converter SPC-91-37) (NPD 1)). Such variations in neutral point potential may cause a voltage to be excessively applied to a switching element.

As one method for preventing such a disadvantage, NPD 1 discloses a configuration in which a voltage command for the power conversion device is corrected according to the voltage difference between DC voltages on two capacitors such that the DC voltages on two capacitors connected in series and forming a DC power supply circuit are equal to each other. According to this NPD 1, the compensation amount produced based on the voltage difference between the DC voltages on two capacitors is subjected to polarity conversion as required and added to an output voltage command for each phase of the 3-level inverter, thereby generating a final output voltage command. In addition, polarity conversion of the compensation amount is performed based on the active power and the reactive power that are output from the 3-level inverter, and on the inverter output frequency. In the following, control for suppressing variations in potential at the neutral point will be referred to as "DC voltage balance control".

CITATION LIST

PATENT DOCUMENT

PTD 1: Japanese Patent Laying-Open No. 07-79574
PTD 2: Japanese Patent Laying-Open No. 07-135782

NON PATENT DOCUMENT

NPD 1: "Balancing Control of DC Input Capacitor Voltage on NPC Inverter" by Shimamura et al., (The Institute of Electrical Engineers of Japan, The papers of Technical Meeting on Semiconductor Power Converter SPC-91-37)

SUMMARY OF INVENTION

Technical Problem

It is preferable for the power conversion device that the number of switching times in one period of each phase arm is set as low as possible in order to reduce switching loss of a main circuit element. On the other hand, it is necessary to ensure the control responsiveness required in the system to be mounted. Thus, from the viewpoint of achieving both of switching loss reduction and control responsiveness, studies have been conducted for a configuration in which a plurality of 3-level converters are connected in series in multiple stages, so that the outputs from the plurality of 3-level converters are superimposed. In the above-described configuration, low-frequency carrier signals are shifted in phase from each other among the plurality of 3-level converters. Thereby, a power conversion device with an equivalently high carrier frequency is implemented, In each of the 3-level converters, however, the current flowing through the neutral point increases as the number of switching times is reduced, with the result that the potential at the neutral point significantly varies. Accordingly, the above-described DC voltage balance control becomes important. In the conventional DC voltage balance control, on the other hand, the polarity conversion of the compensation amount becomes unstable due to the influence of pulsation of the current flowing through each 3-level converter under no load condition or a light load condition. This caused a problem that the effect of suppressing variations in neutral point potential could not be sufficiently achieved.

Therefore, an object of the present invention is to reliably suppress variations in potential at the neutral point in a power conversion device having a plurality of 3-level converters that are multiple-connected to each other.

Solution to Problem

A power conversion device according to the present invention includes: a plurality of 3-level converters that are multiple-connected in series to an AC power supply; and a control device configured to control operations of the plurality of 3-level converters. Each of the plurality of 3-level converters is arranged between the AC power supply and each of a DC positive bus, a DC negative bus and a DC neutral point bus, and configured to be capable of converting a DC voltage into an AC voltage having three voltage values. A first capacitor and a second capacitor are connected in series between the DC positive bus and the DC negative bus, and a connection point between the first capacitor and the second capacitor is connected to the DC neutral point bus. The control device includes a calculation unit configured to calculate an output voltage command for the plurality of 3-level converters, a carrier signal generation unit configured to generate a carrier signal, a correction unit configured to correct a phase of the carrier signal based on a potential variation on the DC neutral point bus, and a pulse width modulation control unit configured to (i) delay the phase by a prescribed amount based on the carrier signal having the phase corrected by the correction unit as a reference phase to generate a plurality of carrier signals, and (ii) compare the output voltage command with each of the plurality of carrier signals to generate a control command for each of the plurality of 3-level converters.

Advantageous Effects of Invention

According to the present invention, variations in potential at the neutral point can be reliably suppressed in the power conversion device having a plurality of 3-level converters that are multiple-connected to each other.

DESCRIPTION OF EMBODIMENTS

Figure 1:
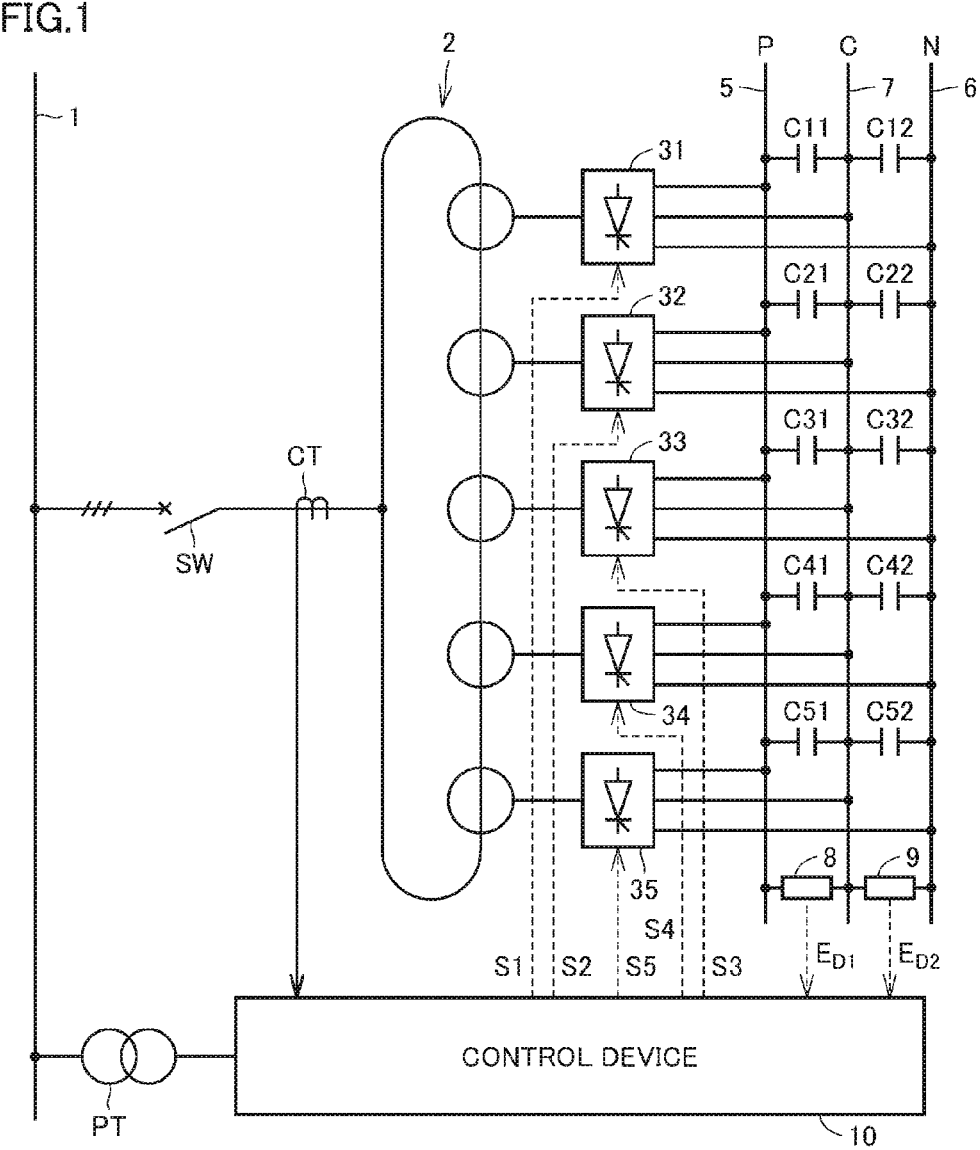
FIG. 1 is a schematic block diagram showing a main circuit configuration of a power conversion device according to an embodiment of the present invention.

The embodiments of the present invention will be hereinafter described with reference to the accompanying drawings, in which the same or corresponding components are designated by the same reference characters, and description thereof will not be repeated.

[Configuration of Power Conversion Device]

FIG. 1 is a schematic block diagram showing a main circuit configuration of a power conversion device according to an embodiment of the present invention. The power conversion device according to the embodiment of the present invention converts, into a three-phase AC power, the DC power supplied from a smoothing circuit serving as a DC power supply circuit. The power conversion device includes: a plurality of 3-level converters that are multiple-connected in series to an AC system 1 through a transformer 2; and a control device 10 controlling operations of the plurality of 3-level converters. For example, the power conversion device consists of five 3-level converters 31 to 35. In the following description, assuming that one 3-level converter is counted as one stage, five 3-level converters 31 to 35 are multiple-connected to form a 5-stage converter. Also, for indicating five 3-level converters 31 to 35 in a distinguishable manner, 3-level converter 31 is referred to as the "first stage"; 3-level converter 32 is referred to as the "second stage"; 3-level converter 33 is referred to as the "third stage"; 3-level converter 34 is referred to as the "fourth stage"; and 3-level converter 35 is referred to as the "fifth stage".

A smoothing circuit is connected between DC positive bus 5 and DC negative bus 6, to smooth the voltage between DC positive bus 5 and DC negative bus 6. The smoothing circuit has a positive potential point P connected to DC positive bus 5, and a negative potential point N connected to DC negative bus 6. The smoothing circuit supplies DC power between DC positive bus 5 and DC negative bus 6.

Specifically, the smoothing circuit consists of five smoothing units provided corresponding to five 3-level converters 31 to 35. Each of the smoothing units has two capacitors connected in series between DC positive bus 5 and DC negative bus 6. In other words, the smoothing unit formed of capacitors C11 and C12 connected in series corresponds to 3-level converter 31 on the first stage; the smoothing unit formed of capacitors C21 and C22 connected in series corresponds to 3-level converter 32 on the second stage; the smoothing unit formed of capacitors C31 and C32 connected in series corresponds to 3-level converter 33 on the third stage; the smoothing unit formed of capacitors C41 and C42 connected in series corresponds to 3-level converter 34 on the fourth stage; and the smoothing unit formed of capacitors C51 and C52 connected in series corresponds to 3-level converter 35 on the fifth stage. Each connection point between two capacitors forming a smoothing unit is defined as a neutral point C that is connected in common to DC neutral point bus 7.

Furthermore, 3-level converters 31 to 35 convert, into three-phase AC power, the DC power supplied from DC positive bus 5, DC neutral point bus 7 and DC negative bus 6 through the smoothing circuit. A switch SW is connected between the primary side of transformer 2 and AC system 1, Switch SW is brought into conduction/out of conduction (turned ON/OFF) by a signal from a high-order control device (not shown), to connect/disconnect a power supply path extending from AC system 1 to the power conversion device.

A current transformer (CT) is inserted into a power supply path extending from AC system 1 to the power conversion device and connected thereto. CT detects a three-phase current flowing through AC system 1, and outputs a three-phase current signal showing the three-phase current to control device 10. A potential transformer (PT) detects a three-phase voltage on AC system 1, and outputs a three-phase voltage signal showing the three-phase voltage to control device 10.

A voltage sensor 8 detects a voltage $E_{D1}$ across both ends of each of capacitors C11, C21, C31, C41, and C51 on the positive side, and outputs a signal showing voltage $E_{D1}$ to control device 10. A voltage sensor 9 detects a voltage $E_{D2}$ across both ends of each of capacitors C12, C22, C32, C42, and C52 on the negative side, and outputs a signal showing voltage $E_{D2}$ to control device 10. In the following description, DC voltage $E_{D1}$ will be also referred to as a "positive-side DC voltage" while DC voltage $E_{D2}$ will be also referred to as a "negative-side DC voltage".

Control device 10 controls operations of 3-level converters 31 to 35. Each of 3-level converters 31 to 35 is formed of a semiconductor switching element (which will be hereinafter simply referred to as a "switching element"), as will be described later in detail. The switching element is a self-exciting semiconductor element such as a GCT (Gate Commutated Turn-off) thyristor, an IGBT (Insulated Gate Bipolar Transistor), and a MOSFET (Metal-Oxide-Semiconductor Field-Effect Transistor). In the present embodiment, a GCT thyristor is applied as a switching element. Also in the present embodiment, PWM (Pulse Width Modulation) control is applied as a control scheme for switching elements.

When switch SW is in an ON state, control device 10 receives a three-phase current signal from CT and a three-phase voltage signal from PT, to perform PWM control. Control device 10 operates 3-level converters 31 to 35 so as to convert the DC power from the smoothing circuit into three-phase AC power. Control device 10 generates switching control signals S1 to S5 for controlling 3-level converters 31 to 35, respectively, by PWM control, and outputs the generated switching control signals S1 to S5 to 3-level converters 31 to 35, respectively.

[Configuration of 3-Level Converter]

Figure 2:
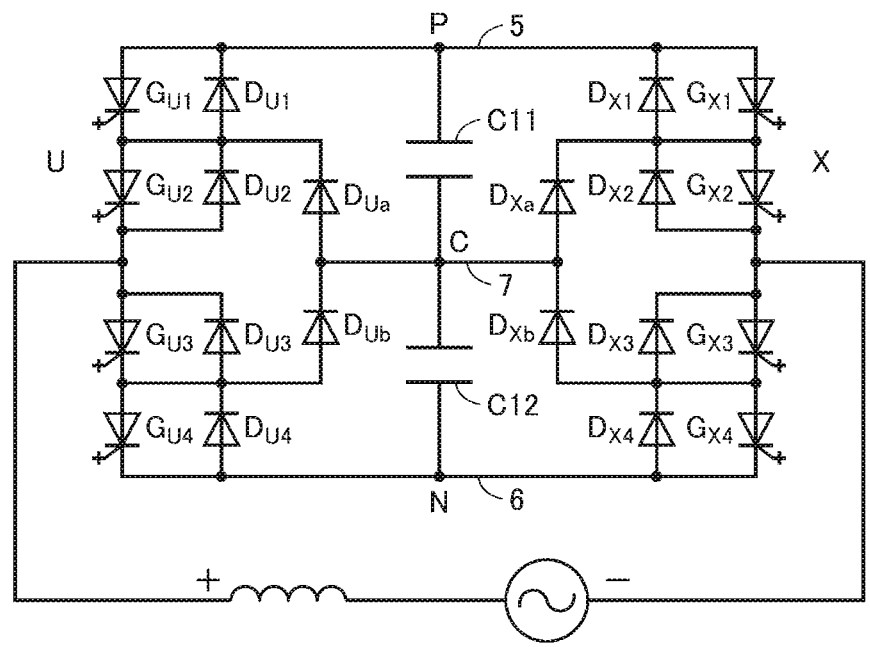
FIG. 2 is a circuit diagram illustrating details of the configuration of a 3-level converter shown in FIG. 1.

FIG. 2 is a circuit diagram illustrating details of the configuration of a 3-level converter shown in FIG. 1. Each of 3-level converters 31 to 35 is a three-phase inverter formed using three single-phase 3-level circuits shown in FIG. 2. FIG. 2 representatively shows the configuration related to U phase-X phase included in three single-phase 3-level circuits forming 3-level converter 31, but the same configuration is applied also to V phase-Y phase and W phase-Z phase.

Referring to FIG. 2, the single-phase 3-level circuit includes a U-phase arm and an X-phase arm connected in parallel between DC positive bus 5 and DC negative bus 6. The U-phase arm includes: switching elements $G_{U1}$, $G_{U2}$, $G_{U3}$, and $G_{U4}$; and diodes $D_{U1}$, $D_{U2}$, $D_{U3}$, $D_{U4}$, $D_{Ua}$, and $D_{ub}$. Switching elements $G_{U1}$, $G_{U2}$, $G_{U3}$, and $G_{U4}$ form a series circuit that is connected between DC positive bus 5 and DC negative bus 6. Antiparallel diodes $D_{U1}$, $D_{U2}$, $D_{U3}$, and $D_{U4}$ are connected to switching elements $G_{U1}$, $G_{U2}$, $G_{U3}$, and $G_{U4}$, respectively. A coupling diode $D_{Ua}$ is connected between DC neutral point bus 7 and a connection point of switching elements $G_{U1}$ and $G_{U2}$. A coupling diode $D_{Ub}$ is connected between DC neutral point bus 7 and a connection point of switching elements $G_{U3}$ and $G_{U4}$.

The X-phase arm includes: switching elements $G_{X1}$, $G_{X2}$, $G_{X3}$, and $G_{X4}$; and diodes $D_{X1}$, $D_{X2}$, $D_{X3}$, $D_{X4}$, $D_{Xa}$, and $D_{Xb}$. Switching elements $G_{X1}$, $G_{X2}$, $G_{X3}$, and $G_{X4}$ form a series circuit that is connected between DC positive bus 5 and DC negative bus 6. Antiparallel diodes $D_{X1}$, $D_{X2}$, $D_{X3}$, and $D_{X4}$ are connected to switching elements $G_{X1}$, $G_{X2}$, $G_{X3}$, and $G_{X4}$, respectively. A coupling diode $D_{Xa}$ is connected between DC neutral point bus 7 and a connection point of switching elements $G_{X1}$ and $G_{X2}$. A coupling diode $D_{Xb}$ is connected between DC neutral point bus 7 and a connection point of switching elements $G_{X3}$ and $G_{X4}$.

The connection point between switching elements $G_{U2}$ and $G_{U3}$ in the U-phase arm and the connection point between switching elements $G_{X2}$ and $G_{X3}$ in the X-phase arm are connected as output terminals of the single-phase 3-level circuit to the AC system.

Figure 3:
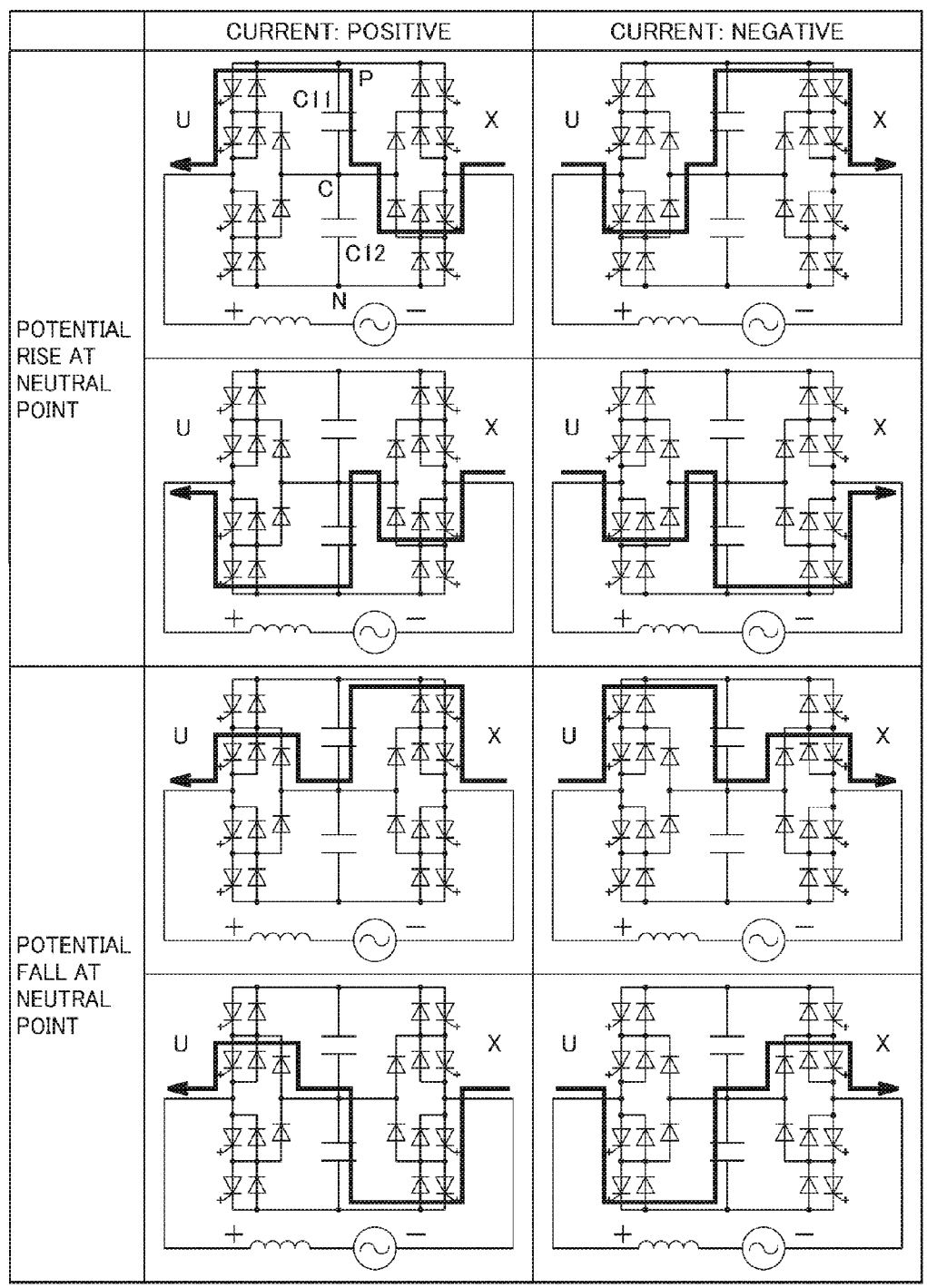
FIG. 3 is a diagram showing each switching pattern in which a neutral point current flows in a single-phase 3-level circuit shown in FIG. 2.

In the single-phase 3-level circuit configured as described above, according to a switching pattern, there occurs a time period during which neutral point C is connected through the switching elements and the diodes to the AC system. The potential at neutral point C varies due to the current flowing through neutral point C (neutral point current) during this time period. FIG. 3 shows each switching pattern in which a neutral point current flows in a single-phase 3-level circuit shown in FIG. 2. In FIG. 3, an arrow shows the direction of the neutral point current for each switching pattern. The direction of the current flowing from the X-phase arm to the U-phase arm is defined as positive while the direction of the current flowing from the U-phase arm to the X-phase arm is defined as negative.

When a current flows from neutral point C toward positive potential point P, capacitor C11 on the positive side turns into a discharge mode, to thereby reduce DC voltage $E_{D1}$ on capacitor C11, so that the potential at neutral point C rises. Alternatively, when a current flows from neutral point C toward negative potential point N, capacitor C12 on the negative side turns into a charge mode, to thereby increase DC voltage $E_{D2}$ on capacitor C12, so that the potential at neutral point C rises.

In contrast, when a current flows from positive potential point P toward neutral point C, capacitor C11 on the positive side turns into a charge mode, to thereby increase DC voltage $E_{D1}$, so that the potential at neutral point C falls. Alternatively, when a current flows from negative potential point N toward neutral point C, capacitor C12 on the negative side turns into a discharge mode, to thereby reduce DC voltage $E_{D2}$, so that the potential at neutral point C falls.

In this way, in the single-phase 3-level circuit, the DC voltages on the positive side and the negative side are brought out of balance according to switching patterns, so that the potential at neutral point C may be significantly deviated toward the positive side or the negative side. Due to such variations in potential at neutral point C, an excessive voltage may be applied to a switching element.

As one method for suppressing such variations in potential at the neutral point, DC voltage balance control has been conventionally studied, for the purpose of controlling switching of the power conversion device according to the voltage difference between the DC voltages on the positive side and the negative side, such that DC voltages on the positive side and the negative side become equal to each other (for example, see NPD 2). The power conversion device according to the present embodiment employs this DC voltage balance control for controlling 3-level converters 31 to 35.

(Configuration of Control Device)

Figure 4:
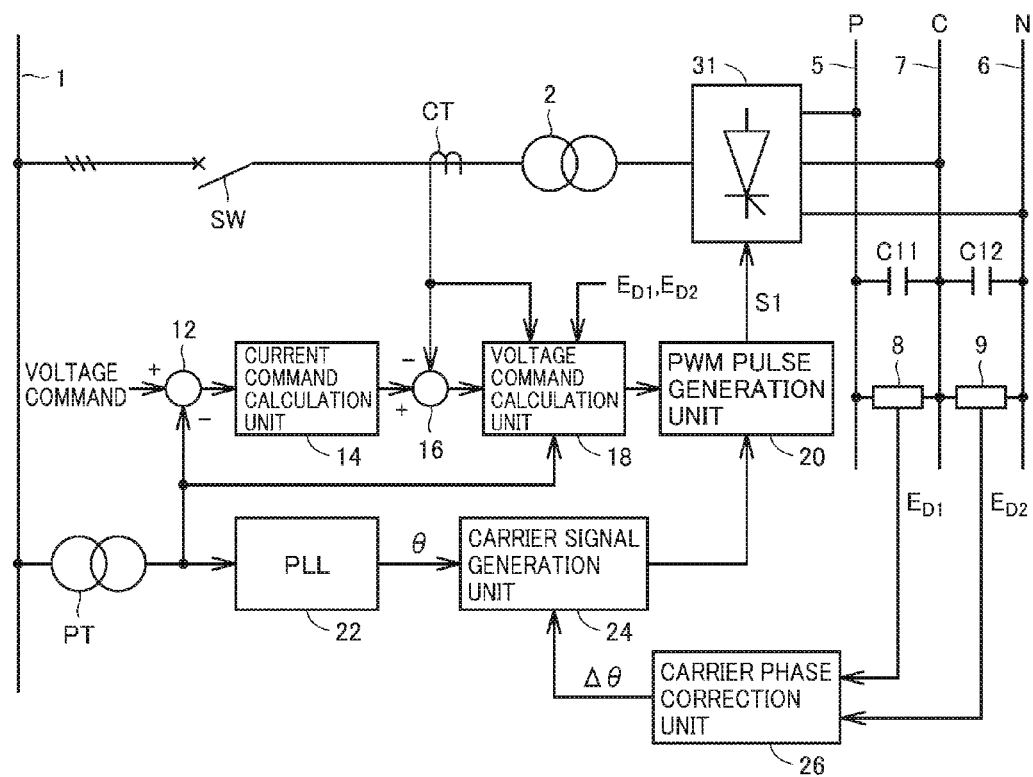
FIG. 4 is a functional block diagram of a control device shown in FIG. 1.

FIG. 4 is a functional block diagram of control device 10 shown in FIG. 1. Referring to FIG. 4, control device 10 includes subtractors 12 and 16, a current command calculation unit 14, a voltage command calculation unit 18, and a PWM pulse generation unit 20. Control device 10 further includes a phased locked loop (PLL) circuit 22, a carrier signal generation unit 24, and a carrier phase correction unit 26.

From a high-order control device (not shown), subtractor 12 receives the operation amount of the voltage applied to each of the U-phase, the V-phase and the W-phase of AC system 1 (which will be hereinafter also referred to as a "voltage command"). Subtractor 12 subtracts the three-phase voltage signal detected by PT from the three-phase voltage command, and outputs a voltage difference.

Current command calculation unit 14 receives the voltage difference from subtractor 12, and generates a current command for each of the U-phase, the V-phase and the W-phase. For example, the current command calculation unit subjects the voltage difference to a proportional operation or a proportional integral operation, thereby generating a three-phase current command.

Subtractor 16 subtracts the three-phase current signal detected by CT from the three-phase current command generated by current command calculation unit 14, and outputs a current difference.

Voltage command calculation unit 18 receives the current difference calculated by subtractor 16, the three-phase current signal detected by CT, and the three-phase voltage signal detected by PT. Voltage command calculation unit 18 further receives a positive-side DC voltage $E_{D1}$ detected by voltage sensor 8 and a negative-side DC voltage $E_{D2}$ detected by voltage sensor 9. Voltage command calculation unit 18 calculates a three-phase voltage command based on these input signals.

Figure 5:
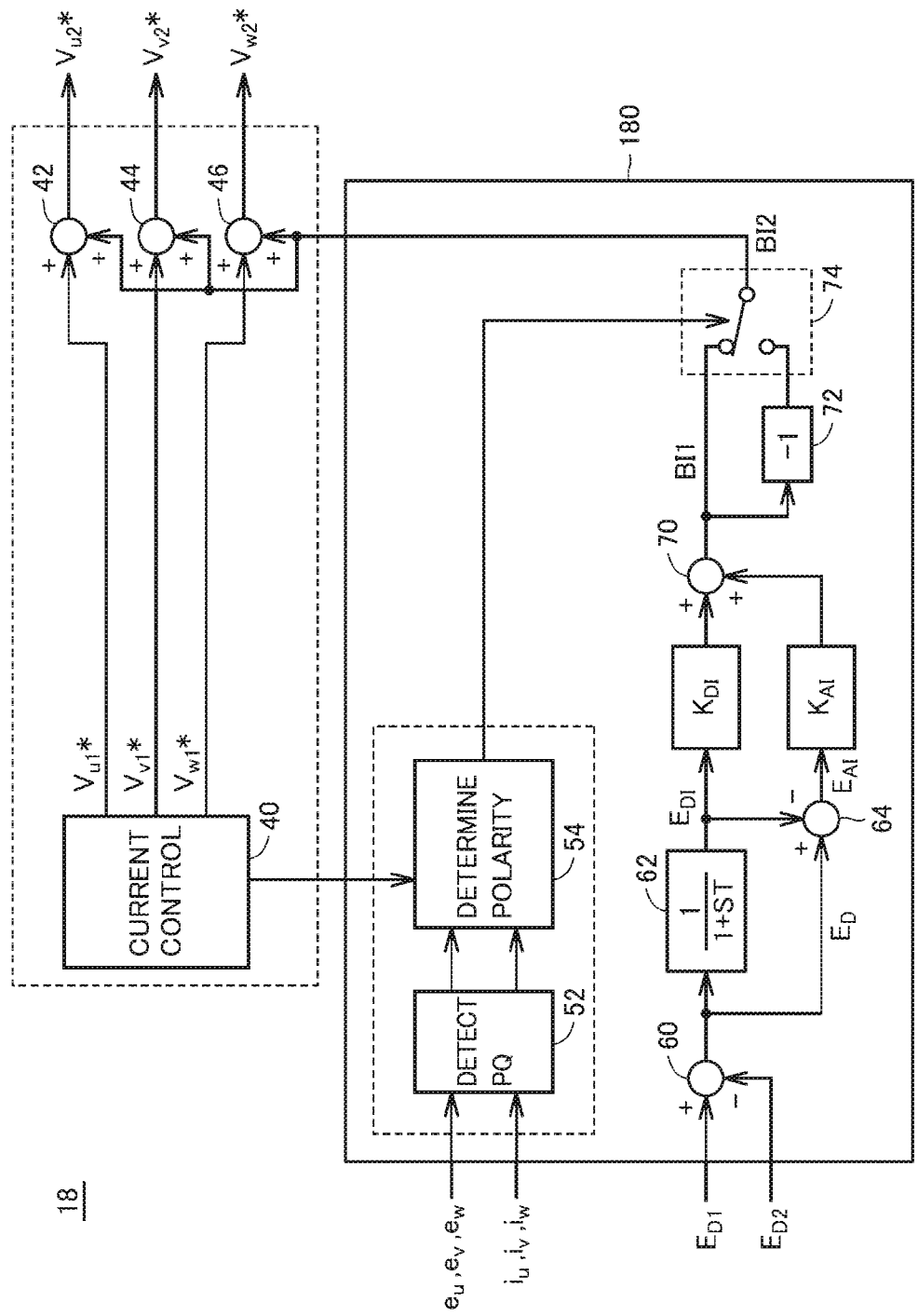
FIG. 5 is a functional block diagram of a voltage command calculation unit shown in FIG. 4.

FIG. 5 is a functional block diagram of voltage command calculation unit 18 shown in FIG. 4.

Referring to FIG. 5, voltage command calculation unit 18 includes a current control unit 40, adders 42, 44 and 46, and a capacitor voltage balance control circuit 180. Current control unit 40 generates three-phase voltage commands $V_{u1}*$, $V_{v1}*$ and $V_{w1}*$ each as a voltage to be applied to AC system 1 such that the current difference calculated by subtractor 16 (the difference between the three-phase current command and the current detected by CT) becomes zero. Current control unit 40 amplifies, for example, the current difference in accordance with proportional control or proportional-plus-integral control, thereby generating three-phase voltage commands $V_{u1}*$, $V_{v1}*$ and $V_{w1}*$.

Based on the voltage difference between positive-side DC voltage $E_{D1}$ detected by voltage sensor 8 and negative-side DC voltage $E_{D2}$ detected by voltage sensor 9 ($E_{D1}-E_{D2}$), capacitor voltage balance control circuit 180 generates a compensation amount BI2 for compensating for the imbalance between DC voltages $E_{D1}$ and $E_{D2}$. The generated compensation amount BI2 is added to each of three-phase voltage commands $V_{u1}*$, $V_{v1}*$ and $V_{w1}*$ received from current control unit 40. Thereby, final three-phase voltage commands $V_{u2}*$, $V_{v2}*$ and $V_{w2}*$ are generated.

Specifically, capacitor voltage balance control circuit 180 includes subtractors 60 and 64, a first-order lag filter 62, feedback coefficients $K_{DI}$ and $K_{AI}$, an adder 70, a polarity inversion unit 72, a PQ detection unit 52, a polarity determination unit 54, and a switching unit 74.

Subtractor 60 subtracts negative-side DC voltage $E_{D2}$ detected by voltage sensor 9 from positive-side DC voltage $E_{D1}$ detected by voltage sensor 8, and outputs a voltage difference $E_D(=E_{D1}-E_{D2})$. First-order lag filter 62 smoothes the input voltage difference $E_D$ in the time axis direction, thereby generating a DC component $E_{DI}$. Subtractor 64 generates an AC component $E_{AI}$ from the deviation between voltage difference $E_D$ and DC component $E_{DI}$.

DC component $E_{DI}$ and AC component $E_{AI}$ are multiplied by feedback coefficients $K_{DI}$ and $K_{AI}$, respectively, and added to each other by adder 70, so that a compensation amount BI1 is generated. Polarity inversion unit 72 inverts the polarity of compensation amount BI1.

Based on three-phase voltages $e_u$, $e_v$ and $e_w$ and three-phase currents $i_u$, $i_v$ and $i_w$ of AC system 1, PQ detection unit 52 detects active power P and reactive power Q output by the power conversion device. Based on active power P and reactive power Q of the power conversion device and on the output frequency of the power conversion device from current control unit 40, polarity determination unit 54 generates a polarity switching signal.

Switching unit 74 selects one of compensation amount BI1 and a compensation amount with inverted polarity (-BI1) according to the polarity switching signal generated by polarity determination unit 54. In this way, the polarity of compensation amount BI is inverted as required, thereby generating a final compensation amount BI2. The generated compensation amount BI2 is added to each of three-phase voltage commands $V_{u1}*$, $V_{v1}*$ and $V_{w1}*$ by adders 42, 44 and 46, respectively.

As described above, voltage command calculation unit 18 corrects three-phase voltage commands $V_{u1}*$, $V_{v1}*$ and $V_{w1}*$ by using a compensation amount BI2 generated based on the voltage difference between positive-side DC voltage $E_{D1}$ and negative-side DC voltage $E_{D2}$ ($E_{D1}-E_{D2}$), thereby generating final three-phase voltage commands $V_{u2}*$, $V_{v2}*$ and $V_{w2}*$. Voltage command calculation unit 18 outputs the generated three-phase voltage commands $V_{u2}*$, $V_{v2}*$ and $V_{w2}*$ to PWM pulse generation unit 20.

Referring back to FIG. 4, based on three-phase voltage commands $V_{u2}*$, $V_{v2}*$ and $V_{w2}*$ generated by voltage command calculation unit 18, PWM pulse generation unit 20 generates switching control signals S1 to S5 for controlling the switching elements included in 3-level converters 31 to 35 to turn on and off. In addition, FIG. 4 representatively shows switching control signal S1 among switching control signals S1 to S5, which is used for controlling 3-level converter 31 on the first stage.

PLL circuit 22 detects a phase θ of each phase voltage from the three-phase voltage on AC system 1 detected by PT. Carrier signal generation unit 24 calculates a frequency of AC system 1 based on phase θ detected by PLL circuit 22. Then, based on the frequency of AC system 1, carrier signal generation unit 24 calculates a frequency of the carrier signal used in PWM control and generates a carrier signal of the calculated frequency. It is to be noted that the carrier signal can be formed of a triangular wave or a saw-tooth wave. The following description illustrates a triangular wave. Furthermore, the ratio of the frequency of the carrier signal to the frequency of AC system 1 is assumed to be 6 times. Thereby, in PWM control, the pulse number of the carrier signal included in one cycle of the voltage command is controlled to be six.

Figure 6:
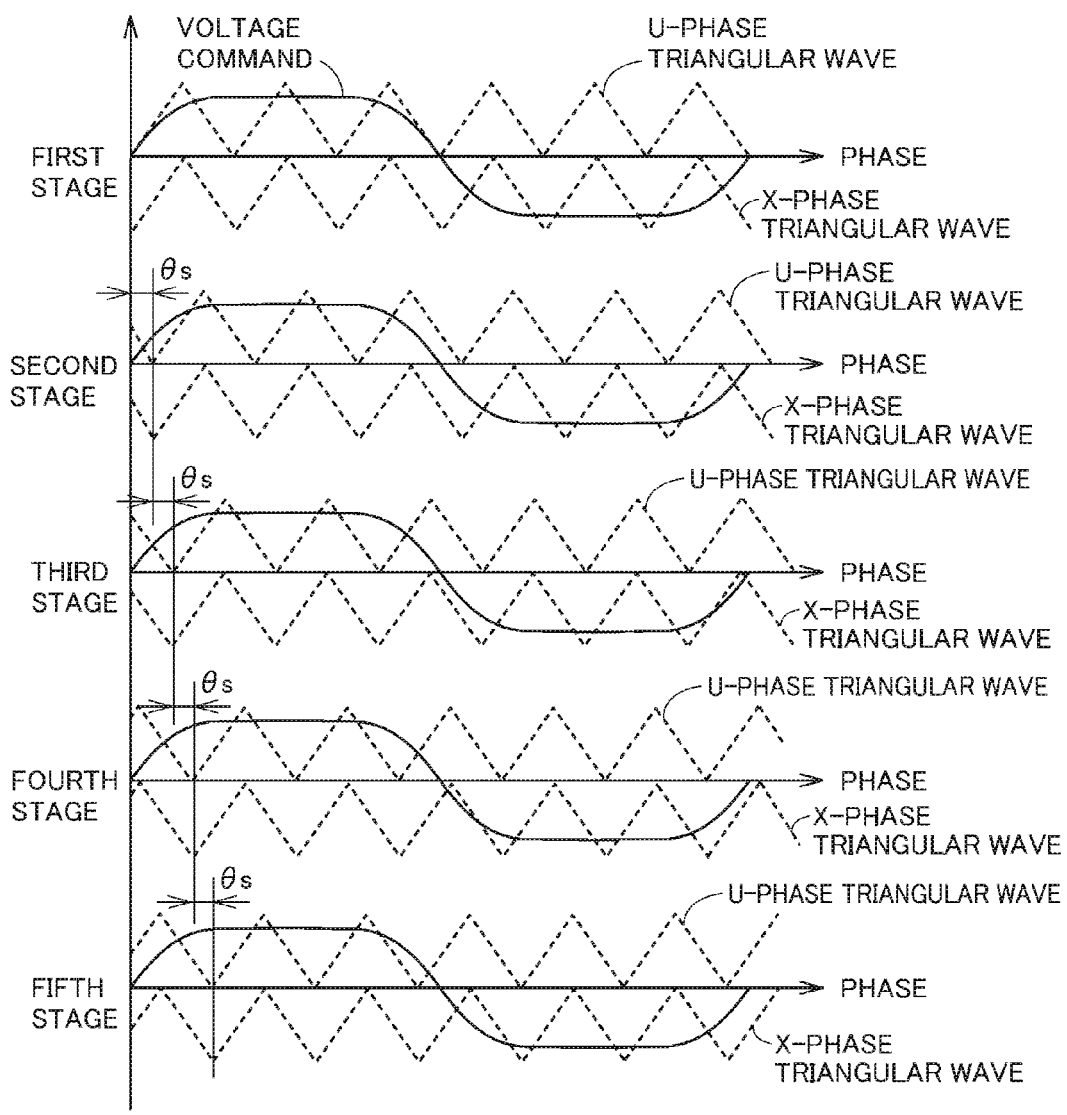
FIG. 6 shows waveform diagrams illustrating the relation between a voltage command and each of five carrier signals.

PWM pulse generation unit 20 uses the carrier signal generated by carrier signal generation unit 24 to generate five carrier signals respectively corresponding to five 3-level converters 31 to 35. These five carrier signals have a phase difference. FIG. 6 shows waveform diagrams illustrating the relation between a voltage command and each of these five carrier signals.

Referring to FIG. 6, the carrier signal on the first stage is used for generating switching control signal SI for the single-phase 3-level circuit included in 3-level. converter 31 on the first stage. The carrier signal on the first stage consists of a U-phase triangular wave that changes from zero to the positive maximum value, and an X-phase triangular wave that changes from zero to the negative maximum value. The zero crossing point of the carrier signal on the first stage coincides with the zero crossing point of the voltage command. PWM pulse generation unit 20 generates remaining four carrier signals based on this carrier signal on the first stage as a "reference phase".

The carrier signal on the second stage is used for generating switching control signal S2 for the single-phase 3-level circuit included in 3-level converter 32 on the second stage. The carrier signal on the second stage consists of a U-phase triangular wave and an X-phase triangular wave. The carrier signal on the second stage is obtained by delaying the phase of the carrier signal on the first stage by a prescribed amount θs.

The carrier signal on the third stage is used for generating switching control signal S3 for the single-phase 3-level circuit included in 3-level converter 33 on the third stage. The carrier signal on the third stage consists of a U-phase triangular wave and an X-phase triangular wave. The carrier signal on the third stage is obtained by delaying the phase of the carrier signal on the second stage by a prescribed amount θs.

The carrier signal on the fourth stage is used for generating switching control signal S4 for the single-phase 3-level circuit included in 3-level converter 34 on the fourth stage. The carrier signal on the fourth stage consists of a U-phase triangular wave and an X-phase triangular wave. The carrier signal on the fourth stage is obtained by delaying the phase of the carrier signal on the third stage by a prescribed amount θs.

The carrier signal on the fifth stage is used for generating switching control signal S5 for the single-phase 3-level circuit included in 3-level converter 34 on the fifth stage. The carrier signal on the fifth stage consists of a U-phase triangular wave and an X-phase triangular wave. The carrier signal on the fifth stage is obtained by delaying the phase of the carrier signal on the fourth stage by a prescribed amount θs.

In this way, PWM pulse generation unit 20 uses, as a reference phase, a carrier signal having a zero crossing point coinciding with that of the voltage command to delay the phase by prescribed amount θs relative to this reference phase, thereby generating five carrier signals in total.

PWM pulse generation unit 20 compares the high/low levels between three-phase voltage commands $V_{u2}^*$, $V_{v2}^*$ and $V_{w2}^*$ with each of five carrier signals, thereby generating switching control signals S1 to S5 for controlling the switching elements in 3-level converters 31 to 35 to turn on and off.

Figure 7:
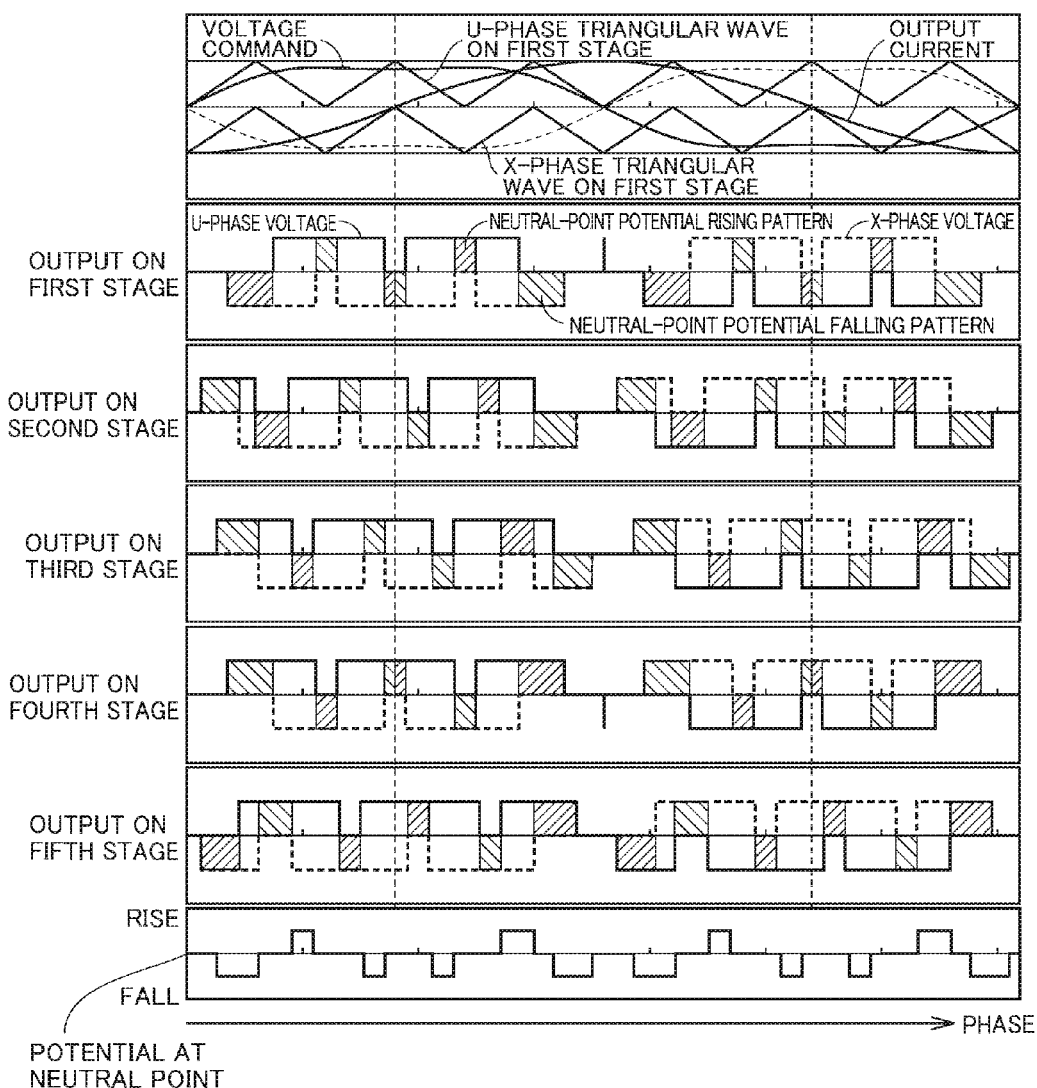
FIG. 7 shows waveform diagrams each illustrating a voltage and a DC voltage output from each of the three-level converters in the state where a carrier signal on the first stage is defined as a reference phase.

FIG. 7 shows waveform diagrams each illustrating a voltage and DC voltages $E_{D1}$ and $E_{D2}$ output from each of three-level converters 31 to 35 in the state where a carrier signal on the first stage is defined as a reference phase. FIG. 7 representatively shows a U-phase voltage and an X-phase voltage that are output from the single-phase 3-level circuit (Fig. 2)

Referring to FIG. 7, in the single-phase 3-level circuit, the high/low levels between the voltage command and each of the U-phase and X-phase triangular waves are compared. Based on the comparison results, it is determined how to combine turning-on and turning-off of the switching elements.

The U-phase triangular wave on the first stage corresponds to a signal having a frequency that is 6 times as high as the voltage command and being in synchronization with the voltage command. The U-phase triangular wave on the first stage has a minimum value of 0V and a maximum value that is higher than the positive peak voltage of the voltage command. The X-phase triangular wave on the first stage corresponds to a signal that is in phase with the U-phase triangular wave on the first stage. The X-phase triangular wave on the first stage has a minimum value lower than the negative peak voltage of the voltage command and a maximum value of 0V.

In the time period during which the voltage command is higher than the level of the U-phase triangular wave on the first stage, switching elements $G_{U1}$ and $G_{U2}$ are turned on and switching elements $G_{U3}$ and $G_{U4}$ are turned off. In the time period during which the voltage command falls within the level of the U-phase triangular wave on the first stage, switching element $G_{U2}$ is turned on and switching elements $G_{U1}$, $G_{U3}$ and $G_{U4}$ are turned off. In the time period during which the voltage command falls within the level of the X-phase triangular wave on the first stage, switching element $G_{U3}$ is turned on and switching elements $G_{U1}$, $G_{U2}$ and $G_{U4}$ are turned off. In the time period during which the voltage command is lower than the level of the X-phase triangular wave on the first stage, switching elements $G_{U3}$ and $G_{U4}$ are turned on and switching elements $G_{U1}$ and $G_{U2}$ are turned off.

In the time period during which the voltage command with inverted sign is lower than the level of the X-phase triangular wave on the first stage, switching elements $G_{X3}$ and $G_{X4}$ are turned on and switching elements $G_{X1}$ and $G_{X2}$ are turned off. In the time period during which the voltage command with inverted sign falls within the level of the X-phase triangular wave on the first stage, switching element $G_{X3}$ is turned on and switching elements $G_{X1}$, $G_{X2}$ and $G_{X4}$ are turned off. In the time period during which the voltage command with inverted sign falls within the level of the U-phase triangular wave on the first stage, switching element $G_{X2}$ is turned on and switching elements $G_{X1}$, $G_{X3}$ and $G_{X4}$ are turned off. In the time period during which the voltage command with inverted sign is higher than the level of the U-phase triangular wave on the first stage, switching elements $G_{X1}$ and $G_{X2}$ are turned on and switching elements $G_{X3}$ and $G_{X4}$ are turned off.

When the switching elements are turned on and off as described above, the single-phase 3-level circuit experiences a time period during which neutral point C as shown in FIG. 3 is connected to the AC system through the switching elements and the diodes. This leads to formation of: a switching pattern in which the potential at neutral point C rises (corresponding to the neutral-point potential rising pattern in the figure) by the current flowing through neutral point C (neutral point current); and a switching pattern in which the potential at neutral point C falls (corresponding to the neutral-point potential falling pattern in the figure) by the neutral point current, as shown in FIG. 7.

In each of 3-level converters 31 to 35, the high/low levels between the voltage command and the carrier signals (the U-phase triangular wave and the X-phase triangular wave) are compared. Based on the comparison results, it is determined how to combine turning-on and turning-off of the switching elements. Consequently, in each of 3-level converters 31 to 35, there occurs: a switching pattern in which the potential at neutral point C rises; and a switching pattern in which the potential at neutral point C falls. As a result, in light of the entire power conversion device, a time period during which the potential at neutral point C rises and a time period during which the potential at neutral point C falls occur in one cycle of the voltage command, as shown on the lowermost stage in FIG. 7.

Figure 8:
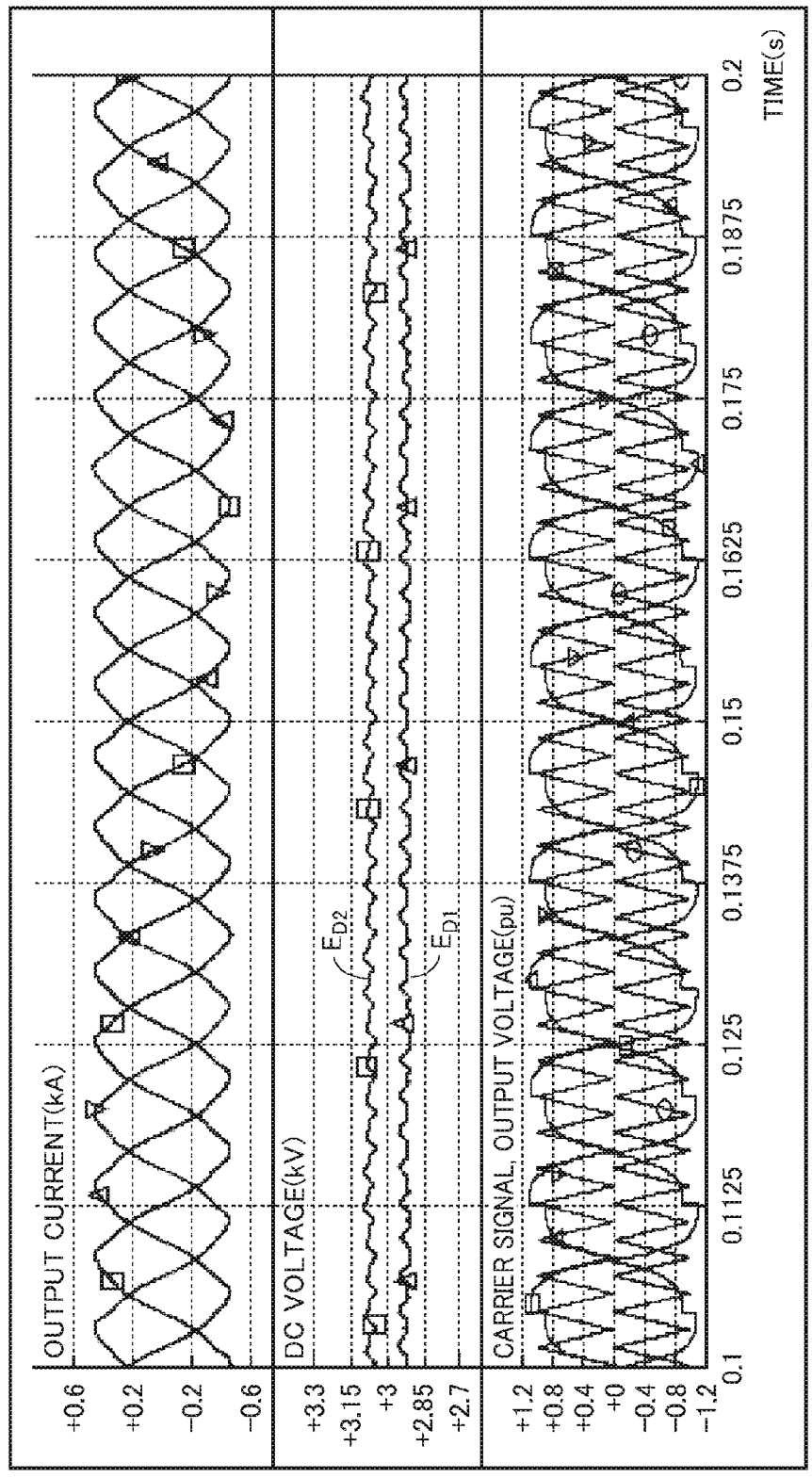
FIG. 8 shows waveform diagrams illustrating the results of a simulation performed for an output current, a DC voltage and an output voltage from the power conversion device in the case where the carrier signal on the first stage is defined as a reference phase.

FIG. 8 shows waveform diagrams illustrating the results of a simulation performed for an output current, DC voltages $E_{D1}$ and $E_{D2}$, and an output voltage from the power conversion device in the case where the carrier signal on the first stage is defined as a reference phase. The simulation in FIG. 8 is performed assuming the case where each of 3-level converters 31 to 35 in the power conversion device performs the operation shown in FIG. 7.

Referring to FIG. 8, when comparing positive-side DC voltage $E_{D1}$ and negative-side DC voltage $E_{D2}$, negative-side DC voltage $E_{D2}$ is higher than positive-side DC voltage $E_{D1}$, and an imbalance occurs between the positive-side DC voltage and the negative-side DC voltage. Accordingly, the potential at neutral point C is deviated toward the positive side, so that a voltage may be excessively applied to switching elements.

Furthermore, as described above, in capacitor voltage balance control circuit 180 (FIG. 5), the polarity of compensation amount BI1 is switched as the polarity of the output current changes. In this case, the waveform of the output voltage is distorted under the influence of pulsation of the output current.

Figure 9:
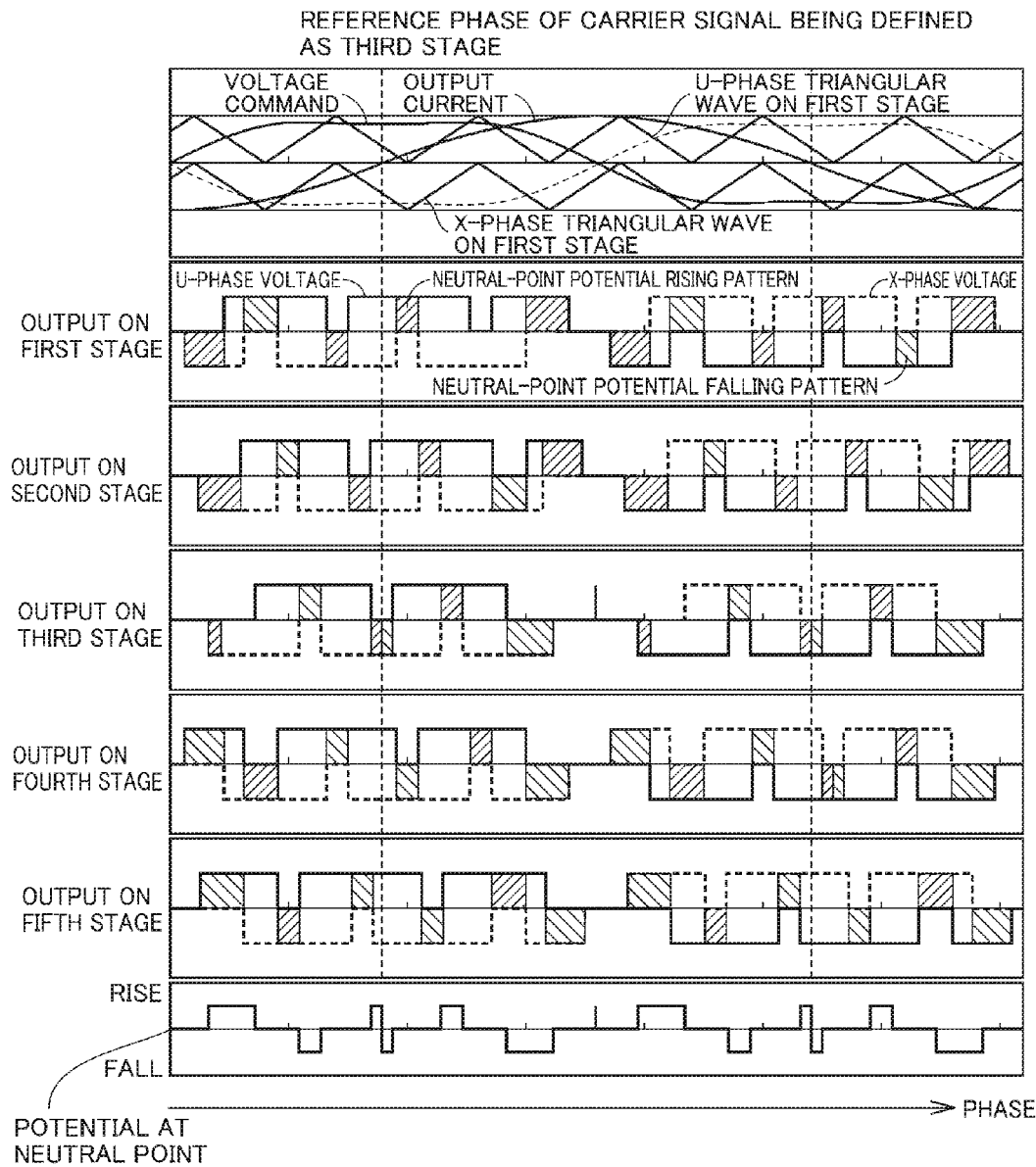
FIG. 9 shows waveform diagrams each illustrating a voltage and a DC voltage output from each of the three-level converters in the state where a carrier signal on the third stage is defined as a reference phase.

FIG. 9 shows waveform diagrams each illustrating a voltage and DC voltages $E_{D1}$ and $E_{D2}$ output from each of three-level converters 31 to 35 in the state where a carrier signal on the third stage is defined as a reference phase. FIG. 9 representatively shows a U-phase voltage and an X-phase voltage that are output from the single-phase 3-level circuit (FIG. 2).

In FIG. 9, the zero crossing point of the voltage command coincide with the zero crossing point of the carrier signal on the third stage (not shown) in place of the carrier signal on the first stage. Then, remaining four carrier signals are generated based on this carrier signal on the third stage as a reference phase. Specifically, the carrier signal on the fourth stage is obtained by delaying the phase of the carrier signal on the third stage by prescribed amount θs. The carrier signal on the fifth stage is obtained by delaying the phase of the carrier signal on the fourth stage by prescribed amount θs. The carrier signal on the first stage is obtained by delaying the phase of the carrier signal on the fifth stage by prescribed amount θs. The carrier signal on the second stage is obtained by delaying the phase of the carrier signal on the first stage by prescribed amount θs.

In the same manner as having been described with reference to FIG. 7, in the single-phase 3-level circuit, the high/low levels between the voltage command and each of the U-phase and X-phase triangular waves are compared. Based on the comparison results, it is determined how to combine turning-on and turning-off of the switching elements. Then, when the switching elements are turned on and off, there occurs a time period during which neutral point C is connected to the AC system through the switching elements and the diodes, thereby producing a switching pattern in which the potential at neutral point C rises and a switching pattern in which the potential at neutral point C falls.

In each of 3-level converters 31 to 35, there occurs: a switching pattern in which the potential at neutral point C rises; and a switching pattern in which the potential at neutral point C falls, as described above. Accordingly, in light of the entire power conversion device, there occurs in one cycle of the voltage command: a time period during which the potential at neutral point C rises; and a time period during which the potential at neutral point C falls, as shown on the lowermost stage in FIG. 9.

Figure 10:
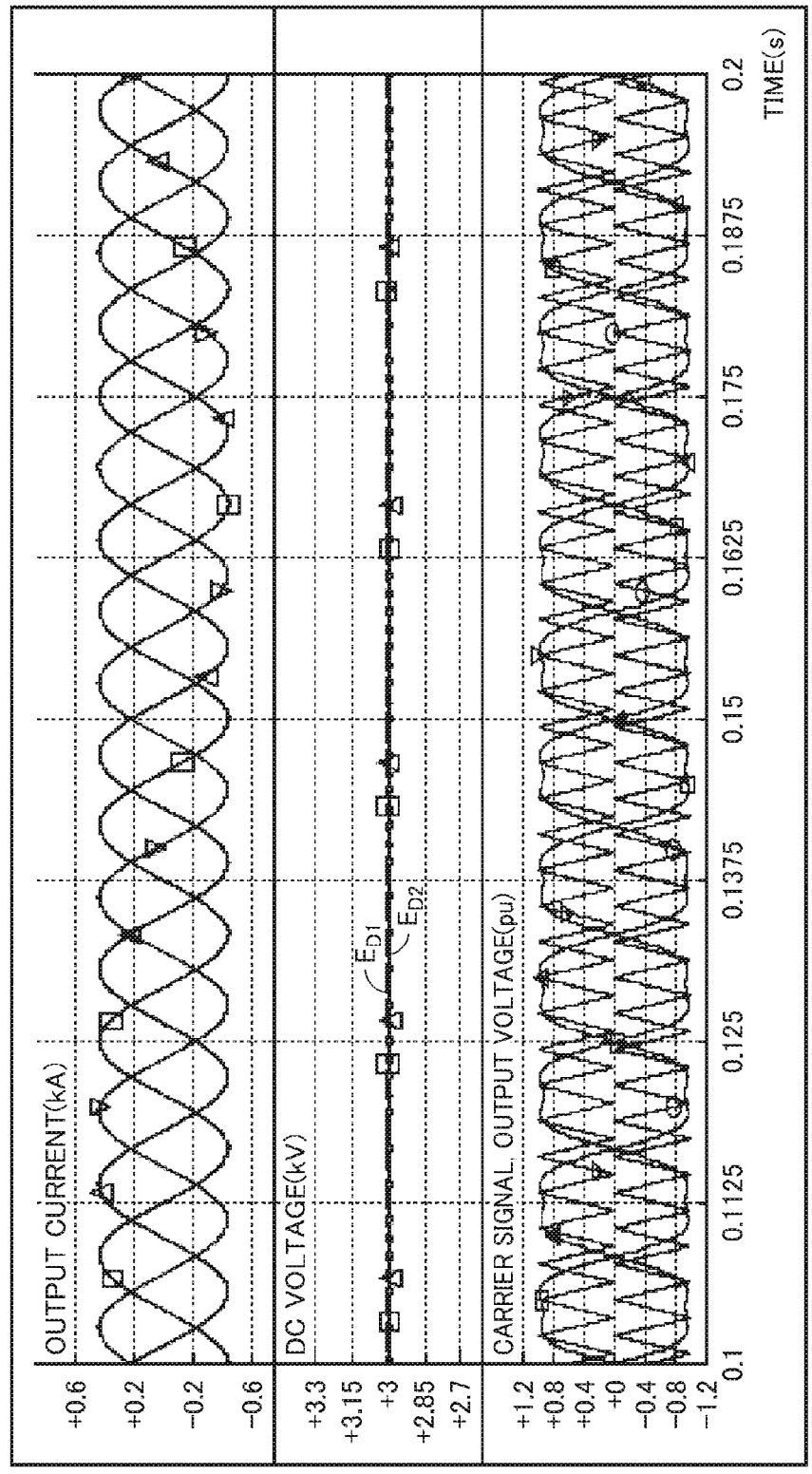
FIG. 10 shows waveform diagrams illustrating the results of a simulation performed for an output current, a DC voltage and an output voltage from the power conversion device in the case where the carrier signal on the third stage is defined as a reference phase.

FIG. 10 shows waveform diagrams illustrating the results of a simulation performed for an output current, DC voltages $E_{D1}$ and $E_{D2}$, and an output voltage from the power conversion device in the case where the carrier signal on the third stage is defined as a reference phase. This simulation is performed assuming the case where each of 3-level converters 31 to 35 in the power conversion device performs an operation shown in FIG. 9.

Referring to FIG. 10, positive-side DC voltage $E_{D1}$ and negative-side DC voltage $E_{D2}$ are almost equal, and an imbalance does not occur between these two DC voltages. Furthermore, since pulsation of the output current is relatively small, distortion of the output voltage waveform resulting from the change in output current polarity is also suppressed.

In this case, when comparing the case where the carrier signal on the first stage shown in each of FIG. 7 and FIG. 8 is defined as a reference phase and the case where the carrier signal on the third stage shown in each of FIGS. 9 and 10 is defined as a reference phase, the imbalance between positive-side DC voltage $E_{D1}$ and negative-side DC voltage $E_{D2}$ is less in the case where the carrier signal on the third stage is defined as a reference phase than in the case where the carrier signal on the first stage is defined as a reference phase. In other words, it turns out that the phase of the carrier signal exerts a significant influence upon the potential at the neutral point in the DC voltage balance control.

Thus, in the power conversion device according to the embodiment of the present invention, the phase of the carrier signal is adjusted according to the variations in the neutral point potential during DC voltage balance control. Specifically, control device 10 corrects the reference phase of the carrier signal such that positive-side DC voltage $E_{D1}$ and negative-side DC voltage $E_{D2}$ are balanced with each other.

Again referring to FIG. 4, control device 10 includes a carrier phase correction unit 26 as a configuration for correcting the reference phase of the carrier signal. Carrier phase correction unit 26 calculates a correction amount Δθ of the reference phase according to DC voltage $E_{D1}$ on capacitor C11 detected by voltage sensor 8 and DC voltage $E_{D2}$ on capacitor C12 detected by voltage sensor 9. Then, carrier phase correction unit 26 outputs the calculated correction amount Δθ to carrier signal generation unit 24.

Figure 11:
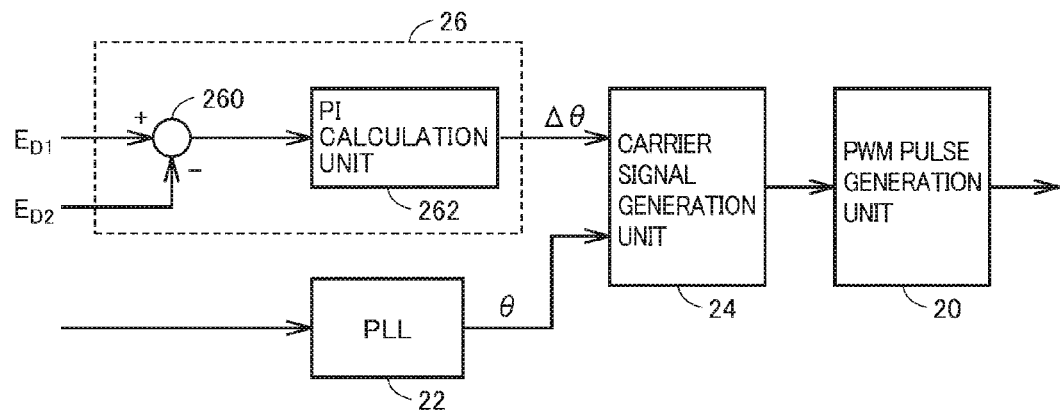
FIG. 11 is a functional block diagram of a carrier phase correction unit shown in FIG. 4.

FIG. 11 is a functional block diagram of carrier phase correction unit 26 shown in FIG. 4.

Referring to FIG. 11, carrier phase correction unit 26 includes a subtractor 260 and a PI calculation unit 262. Subtractor 260 subtracts DC voltage $E_{D2}$ on capacitor C12 detected by voltage sensor 9 from DC voltage $E_{D1}$ on capacitor C11 detected by voltage sensor 8, and outputs a voltage difference $E_D$ (=$E_{D1}$-$E_{D2}$).

PI calculation unit 262 calculates correction amount Δθ by subjecting voltage difference $E_D$ to a proportional integral operation. PI calculation unit 262 calculates correction amount Δθ for implementing the phase relation between the carrier signal and the voltage command such that voltage difference $E_D$ becomes zero, as shown in Fig, 9.

When generating a carrier signal based on phase θ detected by PLL circuit 22, carrier signal generation unit 24 shifts the phase of the generated carrier signal by correction amount Δθ.

Figure 12:
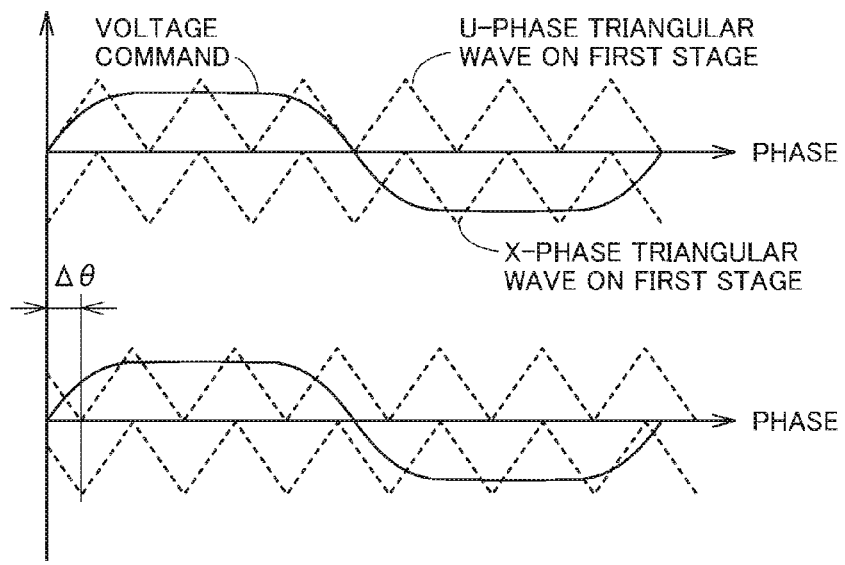
FIG. 12 is a diagram illustrating correction of the phase of a carrier signal in a carrier signal generation unit.

FIG. 12 is a diagram illustrating correction of the phase of the carrier signal in carrier signal generation unit 24.

As described above, carrier signal generation unit 24 calculates a frequency of the AC system based on phase θ detected by PLL circuit 22, to generate a carrier signal having a frequency that is an integral multiple (for example, 6 times) of the frequency of the AC system. As shown on the upper stage in FIG. 12, the zero crossing point of the generated carrier signal coincides with the zero crossing point of the voltage command.

Carrier signal generation unit 24 shifts the phase of this carrier signal by correction amount Δθ, as shown on the lower stage in FIG. 12. Carrier signal generation unit 24 outputs the corrected carrier signal to PWM pulse generation unit 20.

PWM pulse generation unit 20 uses the corrected carrier signal to generate five carrier signals corresponding to five 3-level converters 31 to 35. PWM pulse generation unit 20 defines the corrected carrier signal as a carrier signal on the first stage. On the lower stage, FIG. 12 shows a U-phase triangular wave on the first stage and an X-phase triangular wave on the first stage each acting as a carrier signal on the first stage. PWM pulse generation unit 20 generates remaining four carrier signals based on this carrier signal on the first stage as a reference phase. Then, PWM pulse generation unit 20 compares the high/low levels between three-phase voltage commands $V_{u2}^*$, $V_{v2}^*$ and $V_{w2}^*$ and each of the five carrier signals, thereby generating switching control signals S1 to S5 for controlling the switching elements in 3-level converters 31 to 35 to turn on and off.

As described above, according to the power conversion device in the embodiment of the present invention, the power conversion device having a plurality of 3-level converters that are multiple-connected to each other can keep the balance between the positive-side DC voltage and the negative-side DC voltage by correcting the reference phase of the carrier signal according to the voltage difference between the positive-side DC voltage and the negative-side DC voltage. Thereby, since the effectiveness of DC voltage balance control is improved, variations in neutral point potential can be reliably suppressed.

It should be understood that the embodiments disclosed herein are illustrative and non-restrictive in every respect. The scope of the present invention is defined by the terms of the claims, rather than the description above, and is intended to include any modifications within the meaning and scope equivalent to the terms of the claims.

REFERENCE SIGNS LIST

1 AC system, 2 transformer, 5 DC positive bus, 6 DC negative bus, 7 DC neutral point bus, 8, 9 voltage sensor, 10 control device, 12, 16 subtractor, 14 current command calculation unit, 18 voltage command calculation unit, 20 PWM pulse generation unit, 22 PLL circuit, 24 carrier signal generation unit, 26 carrier phase correction unit, 31 to 35 3-level converter, SW switch, CT current transformer, PT potential transformer.

The invention claimed is:

1. A power conversion device comprising:
   a plurality of 3-level converters that are multiple-connected in series to an AC power supply; and
   a control device configured to control operations of the plurality of 3-level converters,
   each of the plurality of 3-level converters being arranged between the AC power supply and each of a DC positive bus, a DC negative bus and a DC neutral point bus, and configured to convert a DC voltage into an AC voltage having three voltage values,
   a first capacitor and a second capacitor being connected in series between the DC positive bus and the DC negative bus, and a connection point between the first capacitor and the second capacitor being connected to the DC neutral point bus, and
   the control device including
   a calculation unit configured to calculate an output voltage command for the plurality of 3-level converters,
   a carrier signal generation unit configured to generate a carrier signal,
   a correction unit configured to correct a phase of the carrier signal based on a potential variation on the DC neutral point bus, and
   a pulse width modulation control unit configured to (i) delay the phase by a prescribed amount based on the carrier signal having the phase corrected by the correction unit as a reference phase to generate a plurality of carrier signals, and (ii) compare the output voltage command and each of the plurality of carrier signals to generate a control command for each of the plurality of 3-level converters.

2. The power conversion device according to claim 1, wherein the correction unit is configured to calculate a correction amount of the phase of the carrier signal based on a voltage difference between a voltage across both ends of the first capacitor and a voltage across both ends of the second capacitor.

* * * * *